United States Patent [19]

Funabashi et al.

[11] Patent Number: 5,105,414
[45] Date of Patent: Apr. 14, 1992

[54] INFORMATION RECORDING DISK PLAYBACK APPARATUS

[76] Inventors: Tadashi Funabashi; Junji Takahashi; Toshihiko Kurihara, all c/o Pioneer Tokorozawa Plant, 2610, Hanazono 4-chome, Tokorozawa-City, Saitama, Japan

[21] Appl. No.: 248,110

[22] Filed: Sep. 23, 1988

[30] Foreign Application Priority Data

| Nov. 6, 1987 | [JP] | Japan | 62-280414 |
| Nov. 9, 1987 | [JP] | Japan | 62-170920[U] |
| Nov. 9, 1987 | [JP] | Japan | 62-282901 |
| Nov. 9, 1987 | [JP] | Japan | 62-282902 |
| Nov. 9, 1987 | [JP] | Japan | 62-282903 |
| Nov. 9, 1987 | [JP] | Japan | 62-282904 |
| Nov. 9, 1987 | [JP] | Japan | 62-282905 |
| Nov. 9, 1987 | [JP] | Japan | 62-282906 |
| Nov. 9, 1987 | [JP] | Japan | 62-282907 |
| Nov. 9, 1987 | [JP] | Japan | 62-282908 |
| Nov. 9, 1987 | [JP] | Japan | 62-282909 |

[51] Int. Cl.$^5$ .............................. G11B 17/04
[52] U.S. Cl. .................. 369/75.2; 369/77.1; 369/77.2
[58] Field of Search ............ 369/75.2, 77, 77.1, 369/264, 266, 269, 270, 271, 77.2

[56] References Cited

U.S. PATENT DOCUMENTS

| 4,697,259 | 9/1987 | Takanashi | 369/75.2 |
| 4,779,257 | 10/1988 | Matsumoto | 369/75.2 |
| 4,796,251 | 1/1989 | Hirano | 369/75.2 |
| 4,815,065 | 3/1989 | Rouws | 369/75.2 |

FOREIGN PATENT DOCUMENTS 8603296 12/1986 Netherlands .

Primary Examiner—Paul Ip
Attorney, Agent, or Firm—Fleit, Jacobson, Cohn, Price, Holman & Stern

[57] ABSTRACT

An information recording disc playback apparatus has an optical pickup for reading recorded information from a disc clamped on a turntable by a disc clamp mechanism while the disc is being rotated. The disc clamp mechanism comprises a presser member for pressing the disc against the turntable under magnetic forces, and a movable member supporting the presser member idly and movable by a drive mechanism for displacing the presser member toward and away from the turntable. After the disc has been pressed against the turntable by the presser member, the movable member is movable within a gap defined between itself and the presser member. By the movement of the movable member within the gap, the height of an optical pickup mounted on the movable member can be adjusted with respect to the recording surface of the disc.

11 Claims, 18 Drawing Sheets

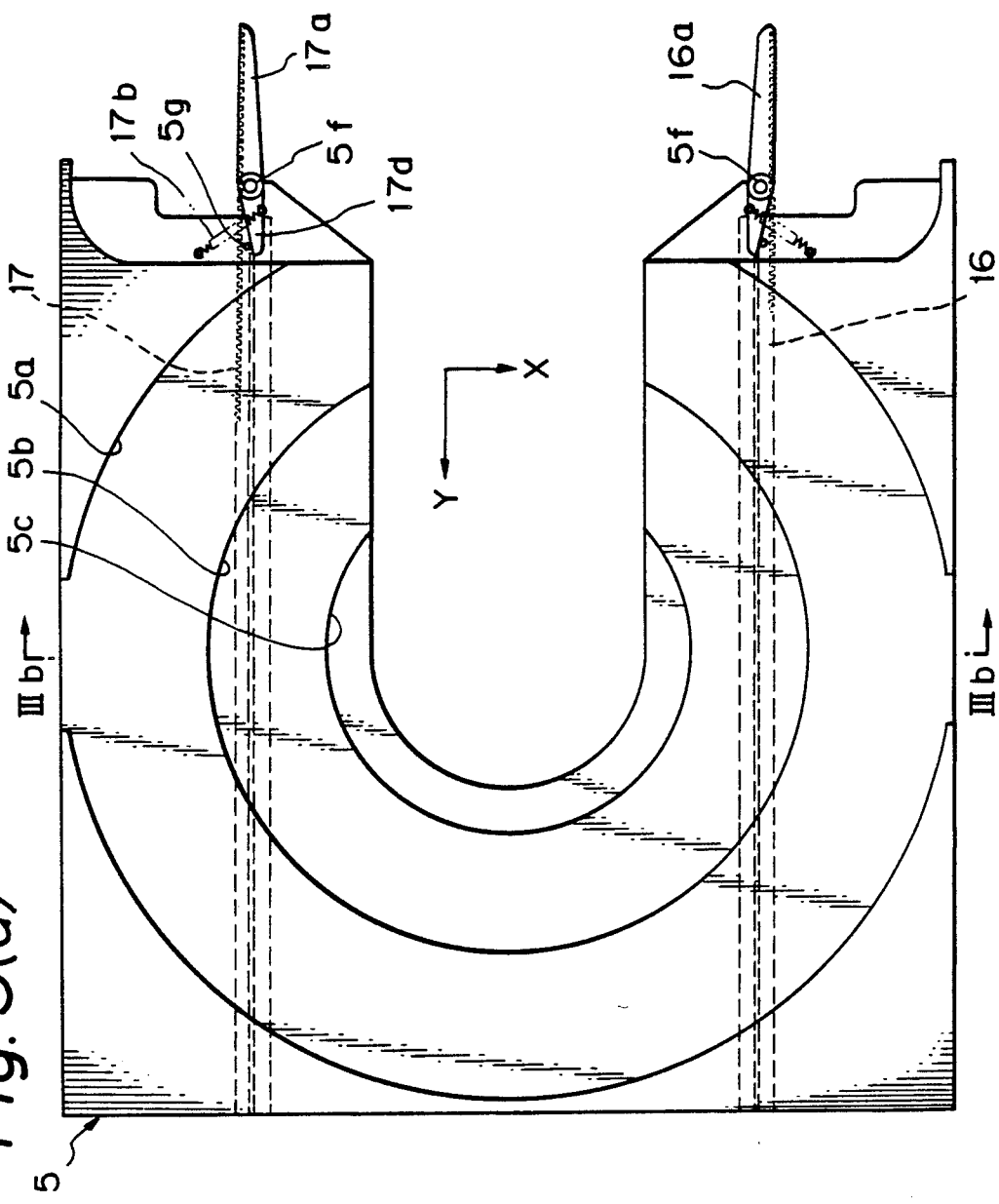

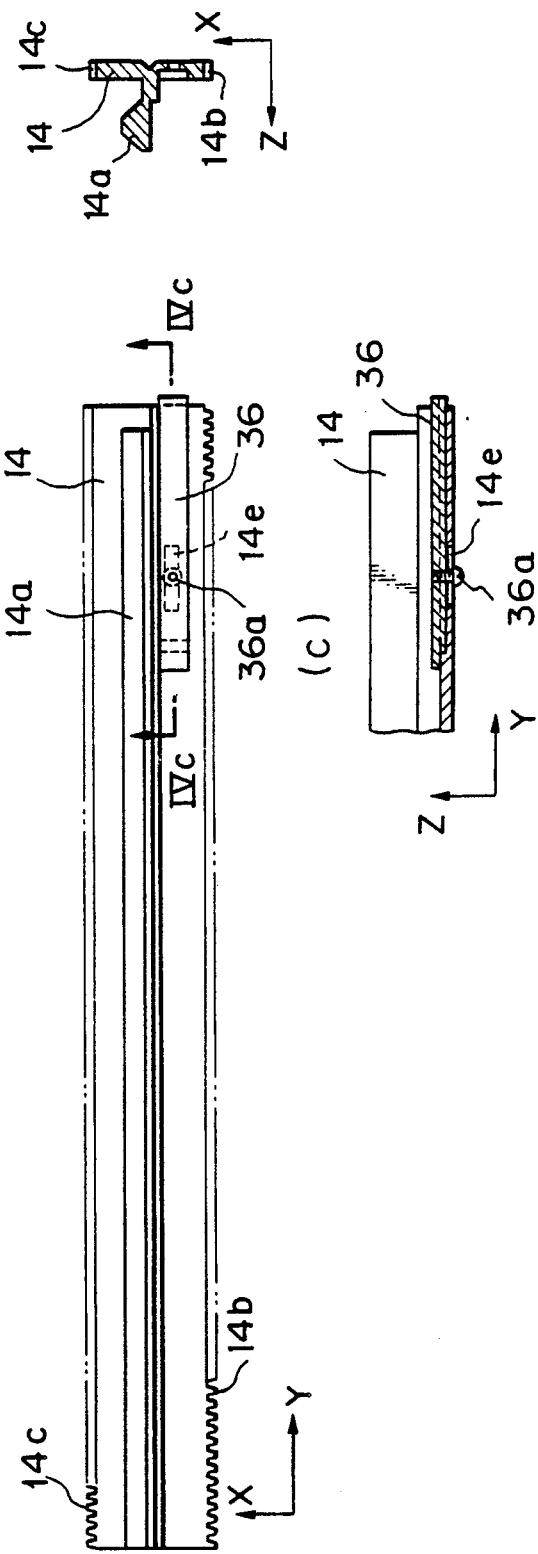

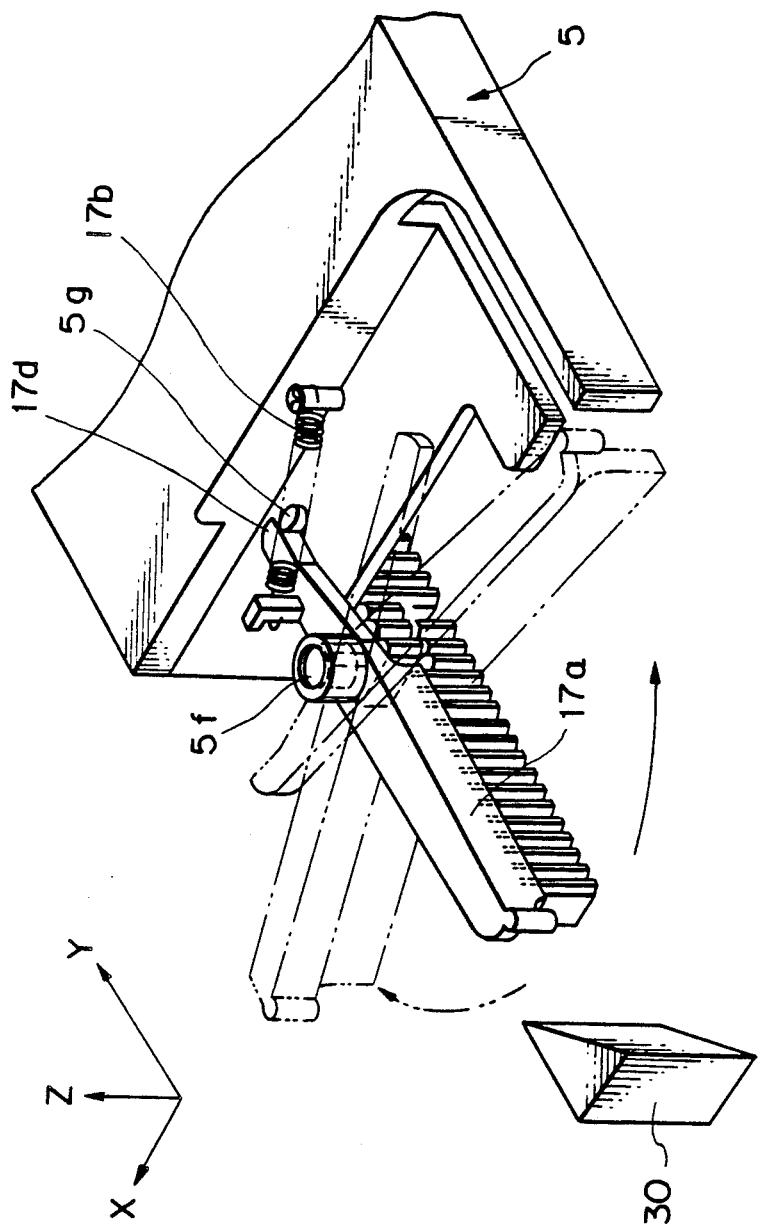

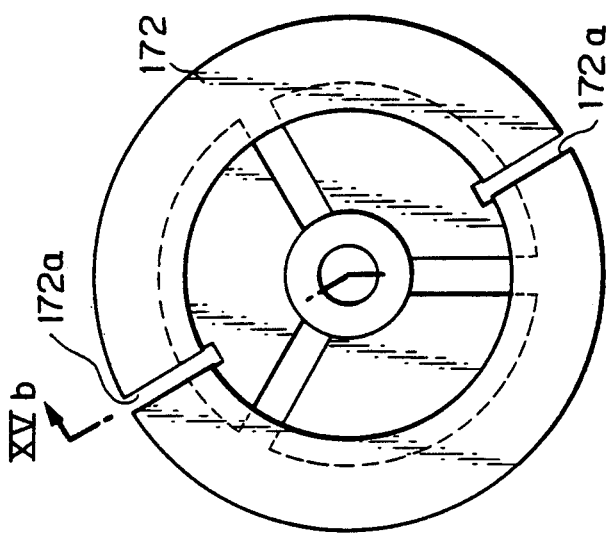
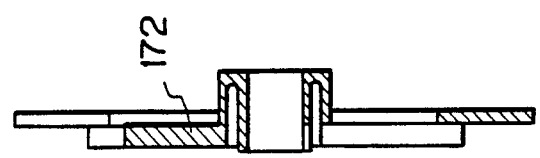
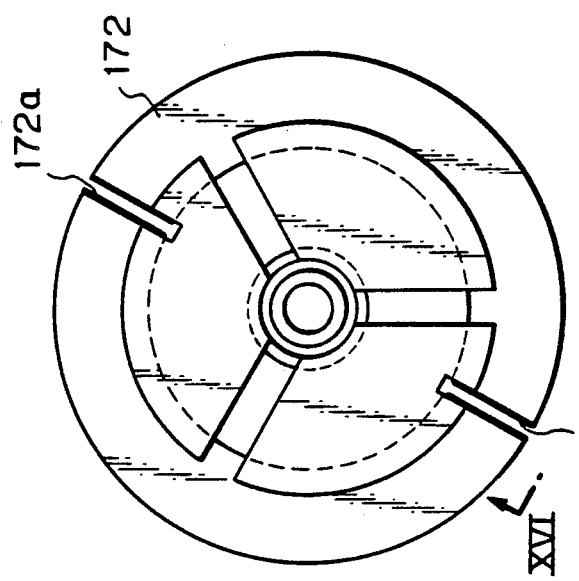
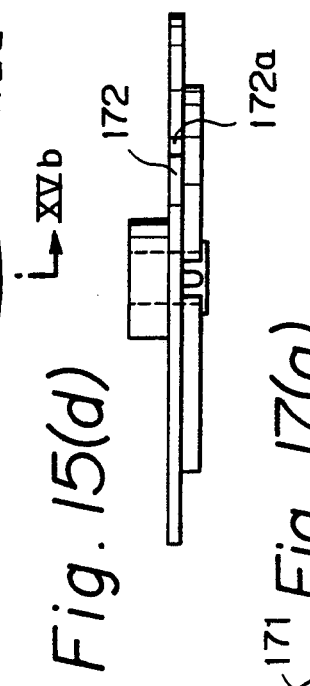
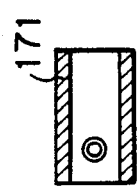
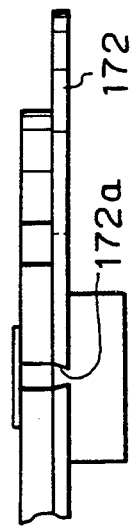

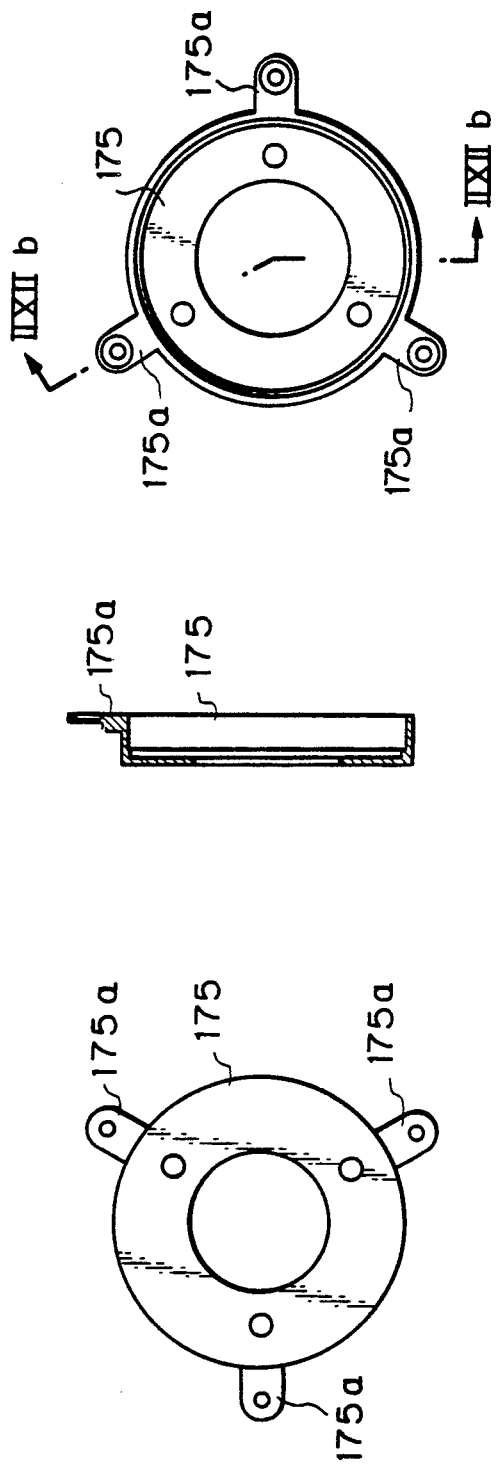

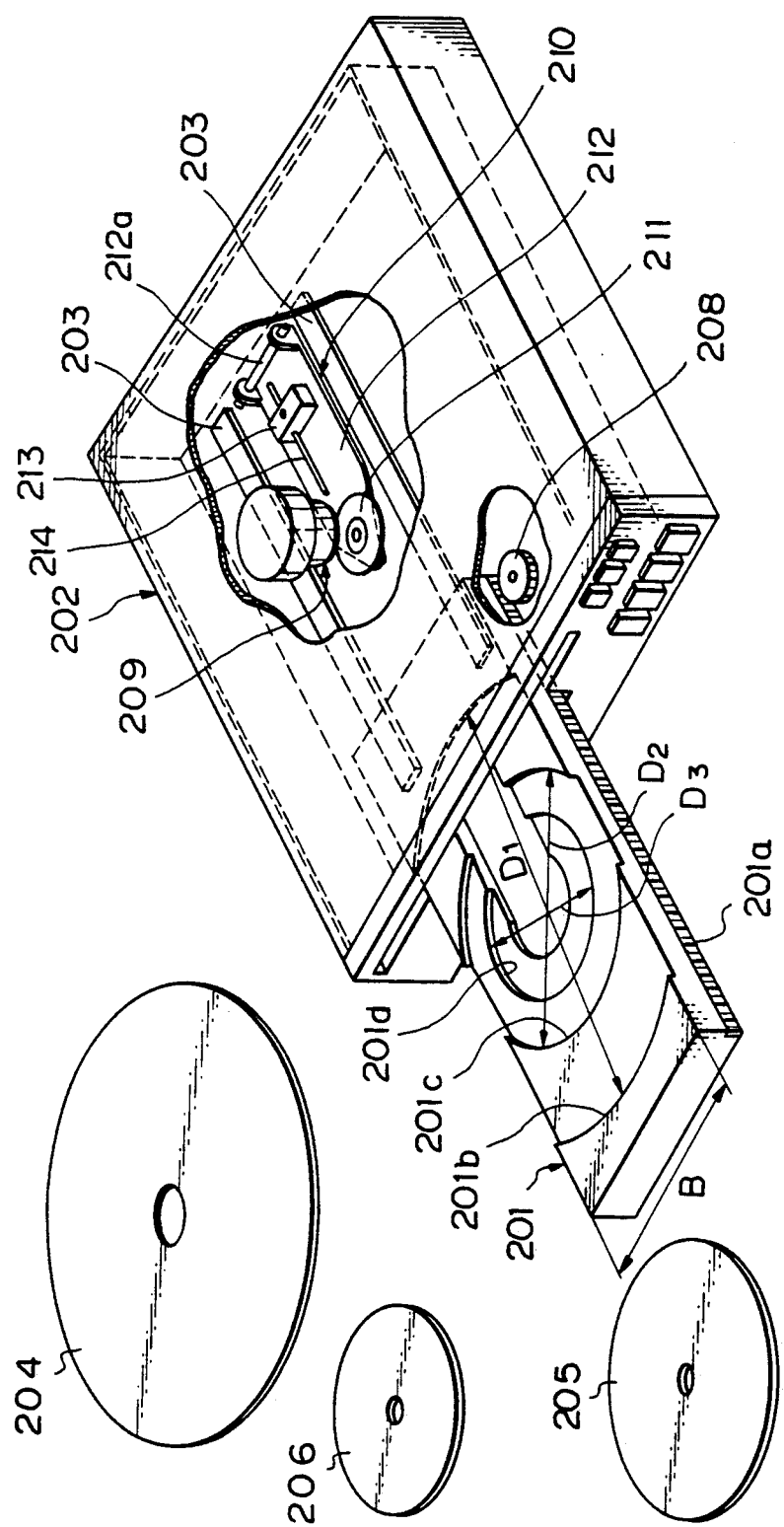

INFORMATION RECORDING DISK PLAYBACK APPARATUS

BACKGROUND OF THE INVENTION

1. Field of the Invention

The present invention relates to an information recording disc playback apparatus.

2. Description of the Prior Art

An optical disc playback apparatus has an optical pickup for applying a converged laser beam to recording tracks on an information recording surface of an optical information recording disc and detecting changes in the intensity of light reflected from the information recording surface for reading the recorded information. For reading the recorded information accurately, it is necessary that the laser beam be converged on the recording tracks highly accurately at all times regardless of surface fluctuations resulting from the warpage or other surface defects of the information recording disc. To meet this requirement, the optical pickup includes a servo drive mechanism for moving an objective lens along its optical axis (focusing servo) to converge the laser beam. However, some information recording discs may have surface fluctuations which are too large for the servo drive mechanism to control the objective lens to compensate for such surface fluctuations. Therefore, the servo drive mechanism is associated with a height adjusting mechanism for adjusting the height of the optical pickup along the optical axis at a high speed for a stroke greater than the servo stroke of the servo drive mechanism. The height adjusting mechanism incorporated in conventional optical information recording disc playback apparatus is complex in structure, takes up a large space, with the result that the information recording disc apparatus are costly to manufacture and large in size.

SUMMARY OF THE INVENTION

In view of the aforesaid drawbacks of the conventional information recording disc playback apparatus, it is a major object of the present invention to provide an information recording disc playback apparatus which is less costly to manufacture and is smaller in size.

Another object of the present invention is to provide an information recording disc apparatus which allows a disc to be loaded smoothly and highly accurately, and can be assembled with ease and efficiency.

According to a first aspect of the present invention, an information recording disc playback apparatus comprises a turntable having a disc carrying surface for carrying an optical information recording disc thereon, a single movable member movable in a plane substantially normal to the disc carrying surface, a gripper member mounted on the single movable member for gripping the optical information recording disc between itself and the disc carrying surface by means of, for example, a magnetic force, guiding and positioning means mounted on the single movable member for moving an optical pickup substantially parallel to the disc carrying surface, and positioning means for positioning the movable member.

According to a second aspect of the present invention, an information recording disc playback apparatus comprises a turntable having a disc carrying surface for carrying an optical information recording disc thereon, a single movable member movable in a plane substantially normal to the disc carrying surface, a gripper member mounted on the single movable member for gripping the optical information recording disc between itself and the disc carrying surface by means of, for example, a magnetic force, guiding and positioning means mounted on the single movable member for moving an optical pickup substantially parallel to the disc carrying surface, positioning means for positioning the movable member, and a tiltable chassis mounted on the movable member, the optical pickup being disposed on the tiltable chassis.

According to a third aspect of the present invention, an information recording disc playback apparatus comprises a turntable having a disc carrying surface for carrying an information recording disc, a presser member for pressing the disc against the disc carrying surface, support member movable in a plane substantially normal to the disc carrying surface and supporting the disc presser member on its side facing the disc carrying surface, and drive means for moving the support member, the drive means comprising urging means for urging the support member in a direction to move the presser member toward the disc carrying surface, the movable member being movable in a direction substantially parallel to the direction in which the support member is movable and being held in engagement with the presser member, and pressing force applying means for applying pressing forces to the movable member in a direction opposite to the urging forces of the urging means for pressing the presser member against the support member.

According to a fourth aspect of the present invention, an information recording disc playback apparatus comprises a turntable having a disc carrying surface for carrying an information recording disc, a presser member for pressing the optical information recording disc against the disc carrying surface, a support member movable in a plane substantially normal to the disc carrying surface and supporting the presser member, and drive means for moving the support member, the drive means comprising a lever having one end engaging the support member, a cam rotatable about a central axis of rotation which is substantially normal to the disc carrying surface and having a helical cam groove defined about the central axis and slidably contacting the lever at the opposite end thereof, and rotative force applying means for applying rotative forces to the cam.

According to a fifth aspect of the present invention, an information recording disc playback apparatus comprises a player housing, a tray movable into and out of the player housing for carrying and delivering a disc into a playback position in disc playback means, and drive means for moving the tray, the drive means comprising a rack disposed on the tray and extending along directions in which the tray is movable, and drive force applying means including a gear meshing with the rack for applying drive forces to the rack, the rack having an innermost portion in a direction in which the tray is stored into the player housing, and the innermost portion being angularly movable with respect to a remainder of the rack.

According to a sixth aspect of the present invention, an information recording disc playback apparatus comprises a player housing, a tray movable into and out of the player housing for carrying and delivering a disc into a playback position in disc playback means, and drive means for moving the tray, the drive means comprising a rack disposed on the tray and extending along directions in which the tray is movable, and drive force applying means including a gear meshing with the rack for applying drive forces to the rack, the rack having an innermost portion in a direction in which the tray is stored into the player housing, the innermost portion being angularly movable with respect to a remainder of the rack, the innermost portion being pivotally supported on the remainder of the rack at an intermediate position between rack and non-rack portions of the innermost portion, the innermost portion being urged in a direction to be angularly moved into abutment against a stopper so as to be kept in line with the remainder, the non-rack portion being flexible, the arrangement being such that when the non-rack portion is turned into a position beyond the stopper, the innermost portion can be separated from the remainder.

According to a seventh aspect of the present invention, an information recording disc playback apparatus comprises a player housing, a guide rail disposed in the player housing, a tray guided by the guide rail for movement into and out of the player housing for carrying and delivering a disc into a position near a playback position in playback means, drive means for moving the tray, and a disc clamp mechanism for displacing the disc having reached the position near the playback position, off the tray, and pressing the disc into the playback position for playback, the guide rail being movable in tray guiding directions by drive forces imposed by the drive means for moving the tray, the arrangement being such that after the tray has been stored in the player housing, the drive means moves the guide rail only.

According to an eighth aspect of the present invention, an information recording disc playback apparatus comprises a player housing, a turntable having a disc carrying surface for carrying a disc thereon, a tray movable into and out of the player housing in directions parallel to the disc carrying surface for carrying and delivering the disc into a position near the turntable, drive means for moving the tray, and a disc clamp mechanism for displacing the disc having reached the position near the turntable, off the tray, and pressing the disc against the disc carrying surface, the turntable having low-friction members movable into and out of the disc carrying surface.

According to a ninth aspect of the present invention, an information recording disc playback apparatus comprises a turntable having a disc carrying surface for carrying an information recording disc thereon, a motor for directly rotating the turntable, a first carrier member carrying the turntable and the motor, a second carrier member carrying an optical pickup and a presser member for pressing the information recording disc against the disc carrying surface, the first and second carrier members being relatively movable in a plane substantially normal to the disc carrying surface for positioning and pressing the information recording disc on the disc carrying surface, the turntable being composed of a support plate fixed to a rotatable shaft of the motor, a disc carrying plate mounted on the support plate for carrying the information recording disc, and coupling means for carrying the disc carrying plate on the support plate to allow the center of rotation of the disc carrying plate to be displaced eccentrically with respect to the center of rotation of the support plate.

According to a tenth aspect of the present invention, an information recording disc playback apparatus comprises a player housing, a tray movable into and out of the player housing and having a recess having an arcuate outer peripheral edge for carrying and delivering a disc into a playback position in disc playback means, and drive means for moving the tray, the tray having a width smaller than the diameter of the recess.

According to an eleventh aspect of the present invention, a rotative support mechanism comprises a support member having a first opening defined therein and through which an angularly movable member is inserted, a second opening defined in a portion of the angularly movable member which is inserted through the first opening, a spherical member disposed in the second opening at one opening side of the first opening and having a diameter larger than the width of the first opening, urging means for urging the angularly movable member in a direction to move the support member toward the spherical member, and positioning means for positioning the spherical member with respect to the first and second openings.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 3(a) and 3(b) are plan and cross-sectional views of a tray;

FIGS. 4(a), 4(b), 4(c) through 7 are views showing in detail the internal structure illustrated in FIG. 2;

FIGS. 13 through 22(a), 22(b), 22(c) are views illustrating in detail a turntable of an information recording disc playback apparatus according to a second embodiment of the present invention; and FIG. 23 is a perspective view, partly cut away, of an information recording disc playback apparatus according to a third embodiment of the present invention.

DETAILED DESCRIPTION OF THE PREFERRED EMBODIMENTS

An information recording disc playback apparatus according to a first embodiment of the present invention is shown herein as an automatic loading disc player capable of automatically loading a disc into a playback position for playback.

Figure 1:
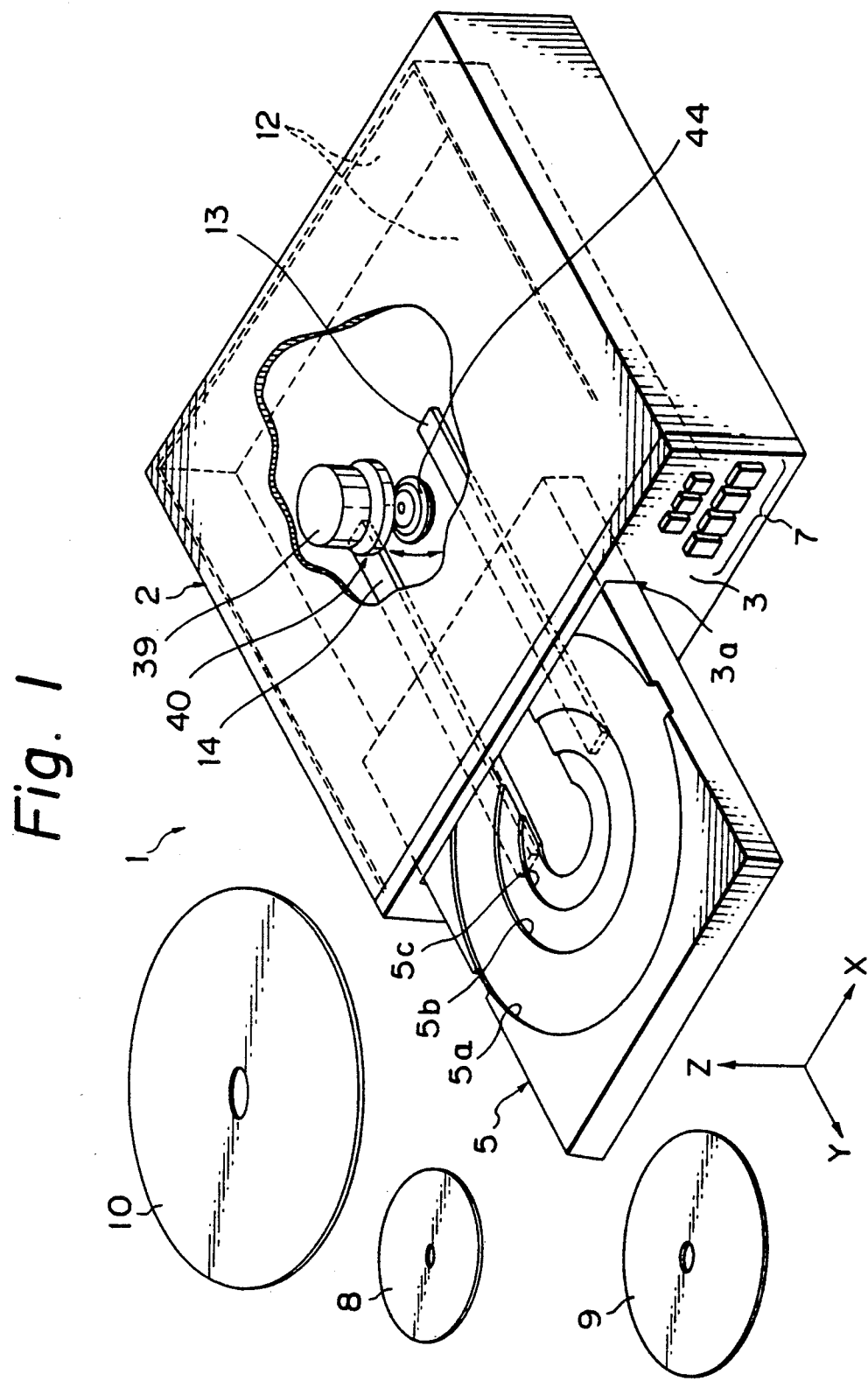
FIG. 1 is a perspective view, partly cut away, of an information recording disc playback apparatus according to a first embodiment of the present invention.

As shown in FIG. 1, the automatic loading disc player, generally designated by the reference numeral 1, includes a player housing 2 having a front panel 3 having a rectangular slot 3a defined therein for allowing a tray 5 to be projected out of the player housing 2, the slot 3a extending in lateral or leftward and rightward directions. The lateral or leftward and rightward directions used herein are defined as being perceived when one views the automatic loading disc player, from back to front, in the direction of the arrow Y. The arrow X indicates the leftward direction, and the arrow Z indicates an upward direction. The front panel 3 supports thereon a group of switches 7 for operating the disc player 1.

The tray 5 serves to carry and deliver a selected one of three optical information recording discs 8, 9, 10 of three different types. The tray 5 has on its upper surface three concentric arcuate recesses 5a, 5b, 5c stepped to different depths for supporting the respective discs 10, 9, 8, respectively.

Figure 2:
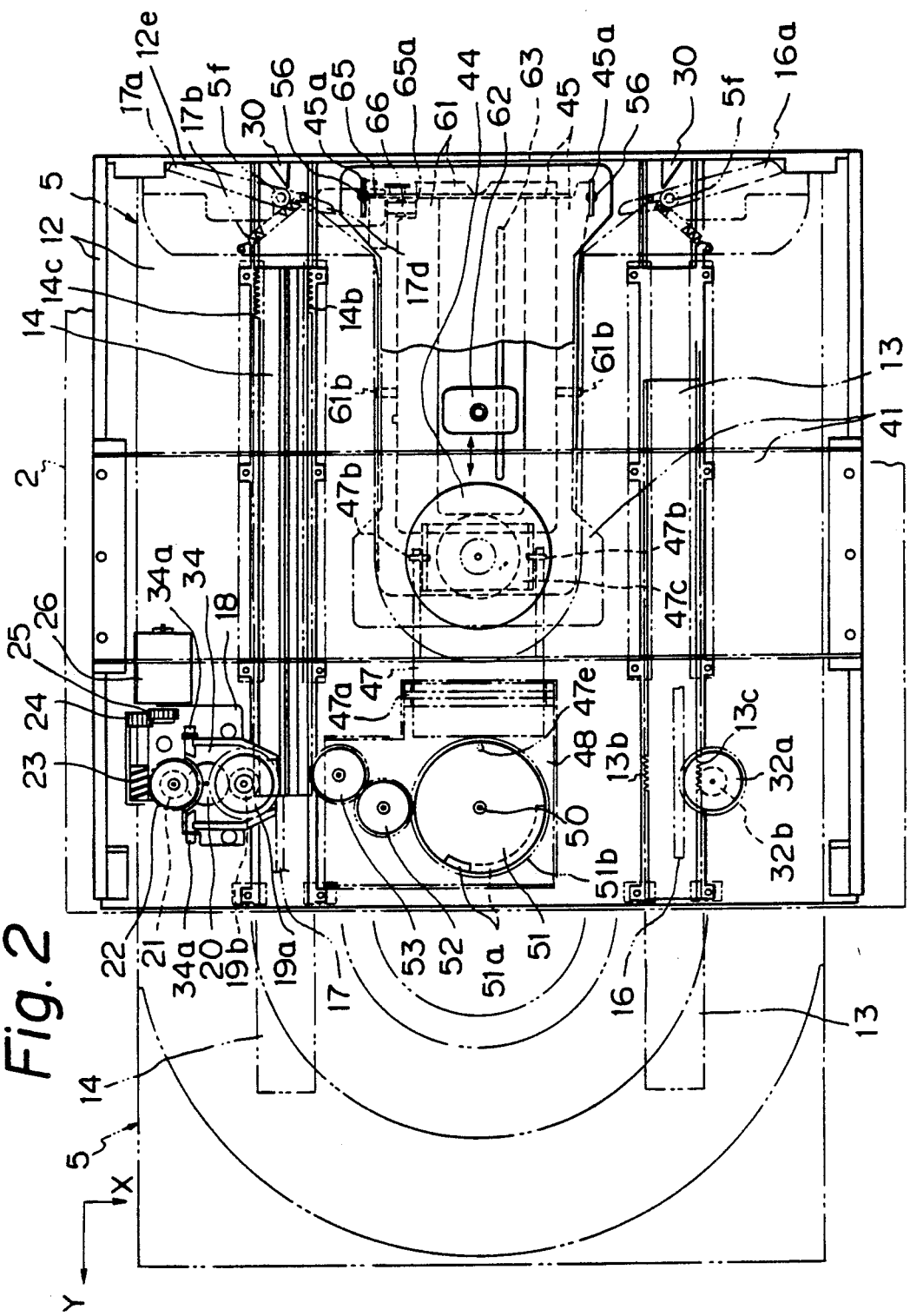
FIG. 2 is a plan view showing an internal structure of the information recording disc playback apparatus shown in FIG. 1.
Figure 5A:
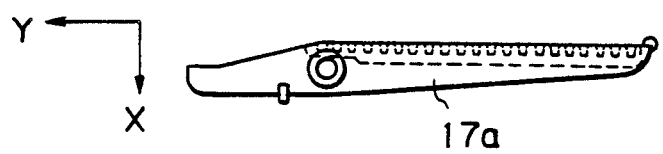
Figure 5B:
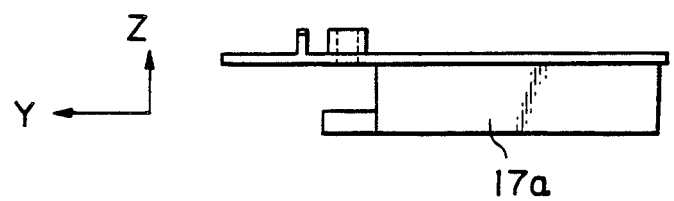
Figure 5C:
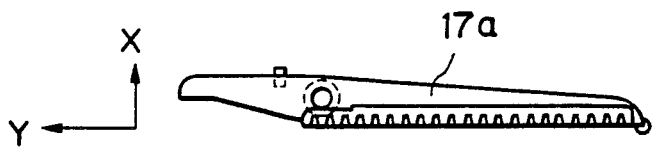
Figure 5D:
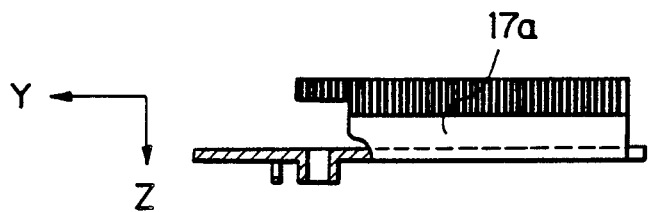

As also shown in FIG. 2, a chassis 12 in the form of a rectangular parallelepiped with front and upper open sides is fixedly mounted in the player housing 2. The chassis 12 supports thereon a pair of laterally spaced lefthand and righthand guide rails 13, 14 extending parallel to each other for guiding the tray 5 in sliding contact therewith, the guide rails 13, 14 extending forwardly and rearwardly in fore-and-aft directions (i.e., in the direction of the arrow Y and the direction opposite thereto) The tray 5 can freely be moved along the guide rails 13, 14 into and out of the player housing 2. FIGS. 3(a) and 3(b) show the tray 5 in greater detail, whereas FIGS. 4(a) and 4(c) show the righthand guide rail 14. The lefthand guide rail 13 is not illustrated in detail as it is substantially identical in shape to the righthand guide rail 14. As shown in FIG. 3(b), the tray 3 has a pair of laterally spaced slide grooves 5d in which there is fitted a pair of guide ridges 14a (shown in FIGS. 4(a) and 4(b)) extending the entire length over the respective guide rails 13, 14 for smoothly sliding engagement with the tray 5.

As illustrated in FIGS. 3(a) and 3(b), a pair of laterally spaced lefthand and righthand racks 16, 17 are fixed to the lower surface of the tray 5. As shown in FIG. 2, a smaller chassis 18 is mounted on a righthand front end of the chassis 12, and a gear 19a is mounted on the smaller chassis 18 in mesh with the righthand rack 17. The gear 19a is operatively coupled to the output shaft of a motor 26 through a gear 19b concentric with the gear 19a, gears 20, 21, a worm wheel 22, a worm 23, and gears 24, 25. The gears 19a, 19b, 20, 31, the worm wheel 22, the worm 23, the gears 24, 25, and the motor 26 jointly constitute a drive force applying means for applying drive forces to the rack 17. The drive force applying means and the rack 17 in turn serve as a drive means for reciprocally moving the tray 5 back and forth.

As shown in FIGS. 2 and 3(a), the racks 16, 17 have innermost portions 16a, 17a, respectively, projecting from inner ends thereof into the player housing 2. The innermost portions 16a, 17a have respective portions held in sliding contact with the guide rails 13, 14, respectively.

FIGS. 5(a) through 5(d) and 6 show the innermost portion 17a in detail. The other innermost portion 16a is shaped in symmetric relation to the other innermost portion 17a, and hence is not shown in detail. As shown in FIGS. 2, 3, and 6, the tray 5 has upwardly extending pivot pins 5f on its innermost end, and the innermost portions 16a, 16b are pivotally mounted respectively on the pivot pins 5f. The position which the innermost portion 17a takes as shown in FIG. 3(a), or the position taken by the innermost portion 17a as indicated by the solid lines in FIG. 6, i.e., the position in which the innermost portion 17a lies in line with the remainder of the rack 17 except the innermost portion 17a, is referred to as a first bent position. The position which the innermost portion 17a takes as shown in FIG. 2, or the position taken by the innermost portion 17a as indicated by the two-dot-and-dash lines in FIG. 6, i.e., the position which the innermost portion 17a assumes when the tray 5 is stored in the player housing 2, is referred to as a second bent position.

The innermost portion 17a can also be pivotally shifted into a third bent position which is indicated by the dot-and-dash lines in FIG. 6, i.e., which is opposite to the second bent position with the first bent position therebetween. Normally, a stopper 5g mounted on the innermost end of the tray 5 engages the innermost portion 17a so that the innermost portion 17a can be angularly moved only between the first and second bent positions. The innermost portion 17a can be positioned in the first bent position by the stopper 5g. The innermost portion 17a is normally urged toward the third bent position by an urging means comprising a coil spring 17b.

In the third bent position, the innermost portion 17a can be mounted on and dismounted from the tray 5. For detaching the innermost portion 17a from the tray 5, a non-rack portion 17d (shown in FIG. 6) of the innermost portion 17a for engaging the stopper 5g is flexed upwardly (in the direction of the arrow Z) by fingers, and the innermost portion 17a is turned from the first bent position into the third bent position while keeping the non-rack portion 17d out of engagement with the stopper 5g, and then the innermost portion 17a is pulled out of the pin 5f in the third bent position. The innermost portion 17a can be attached to the tray 5 in a process which is a reversal of the above removal process. In the first and second bent positions, the innermost portion 17a is prevented from being removed from the pin 5f by the rear end of the remainder of the rack 17 except the innermost portion 17a. More specifically, when the innermost portion 17a is in the first and second bent positions, a rack portion of the innermost portion 17a engages the rear end of the remainder of the rack 17 to prevent the innermost portion 17a from being detached from the pin 5f. When the innermost portion 17a is in the third position, however, the rack portion of the innermost portion 17a does not engage the rear end of the remainder of the rack 17 so that the innermost portion 17a can be removed from the pin 5f.

As illustrated in FIGS. 2 and 6, guide members 30 are disposed as bending means in the innermost end of the player housing 2 for smoothly engaging the innermost portions 16a, 17a to turn the innermost portions 16a, 17a from the first bent position into the second bent position. Each of the guide members 30 is of a triangular cross-sectional shape for smoothly turning the innermost portions 16a, 17a.

As can be seen from FIG. 2, the guide rails 13, 14 for guiding the tray 5 are movable along their length, i.e., in the directions in which the tray 5 is guided (i.e., in the directions of the arrow Y and the direction opposite thereto). The guide rails 13, 14 can thus project with the tray 5 out of the player housing 2. The guide rails 13, 14 have racks 13b, 13c and 14b, 14c, respectively, on their laterally opposite sides, the racks extending the entire length of the guide rails 13, 14 and along the directions in which the guide rails 13, 14 are movable. As shown in FIG. 2, the gear 19b concentric with the gear 19a meshing with the righthand rack 17 on the tray 5 is held in mesh with the outer rack 14c of the guide rail 14. Similarly, as shown in FIG. 2, the lefthand rack 16 on the tray 5 is held in mesh with a gear 32a rotatably mounted on the chassis 12, and a gear 32b integral with and concentric to the gear 32a is held in mesh with the outer rack 13c of the other guide rail 13. When the motor 26 is energized, the gear 19b is rotated to move the guide rail 14, and the rack 17 on the tray 5 is moved by the gear 19a which is rotated with the gear 19b. Thus, the rack 16 on the tray 5 is also moved to rotate the gears 32a, 32b for thereby moving the other guide rail 13. Therefore, the guide rails 13, 14 are moved by drive forces which are given by the drive means comprising the motor 26 and other members for moving the tray 5. The gear tooth ratios of the gears are selected such that while the tray 5 moves 300 mm, for example, the guide rails 13, 14 move 120 mm, for example. The drive means moves only the guide rail 14 in the rearward direction after the tray 5 has been stored in the player housing 2. An arrangement for moving the guide rail 14 rearwardly will be described below.

Figure 7:
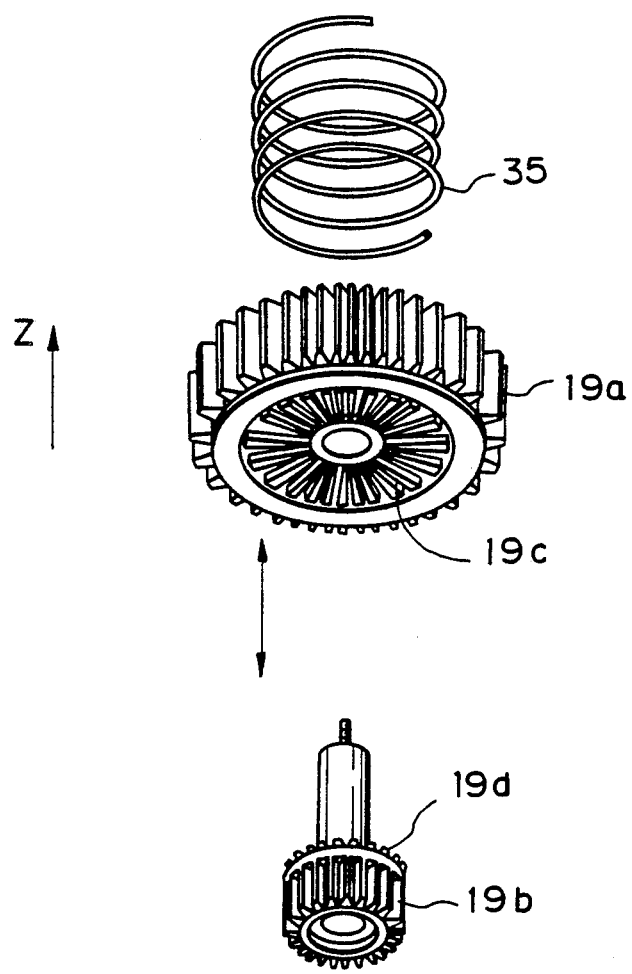

The gear 19a shown in FIG. 2 which meshes with the rack 17 fixed to the tray 5 is mounted on a swing plate 34 which is vertically (in the direction of the arrow Z and the direction opposite thereto) swingably supported on the smaller chassis 18 by means of a pin 34a. The other gears 19b, 20, 21, and the worm wheel 22 which are disposed near the gear 19a are mounted on the smaller chassis 18. As shown in FIG. 7, the gear 19a and the gear 19b which is concentric to the gear 19a and meshes with the outer rack 14c of the guide rail 14 have respective clutches 19c, 19d. By swinging the swing plate 34, the gears 19a, 19b are connected to and disconnected from each other. A coil spring 35 is provided for applying a biasing force to the swing plate 34 and the gear 19a to displace them in the downward direction (i.e., the direction opposite to the direction of the arrow Z). As illustrated in FIGS. 4(a) and 4(c), an engaging plate 36 is fastened by a screw 36a to the front end of the guide rail 14 which has the rack 14c meshing with the gear 19b. The screw 36a is inserted through an oblong hole 14e defined in the guide rail 14 and extending in the longitudinal direction of the guide rail 14. The engaging plate 36 can be adjusted in position by loosening the screw 36a. When the guide rail 14 is stored in the player housing 2, the engaging rail 36 engages a free end of the swing plate 34 to swing the swing plate 34 upwardly against the biasing force of the coil spring 35 (FIG. 7). The clutches 19c, 19d of the gears 19a, 19b are now disengaged from each other, whereupon only the gear 19b is rotated by the motor 26 whereas the gear 19a is not rotated. The position of the engaging plate 36 is selected such that at the same time that the tray 5 is stored in the player housing 2, the clutches 19c, 19d are disengaged from each other. Thus, the drive means including the motor 26 moves only the guide rail 14 in the rearward direction after the tray 5 has been stored in the player housing 2. As described later on, such rearward movement of the guide rail 14 only after the tray 5 has been stored in the player housing 2 actuates a disc clamp mechanism.

Figure 8:
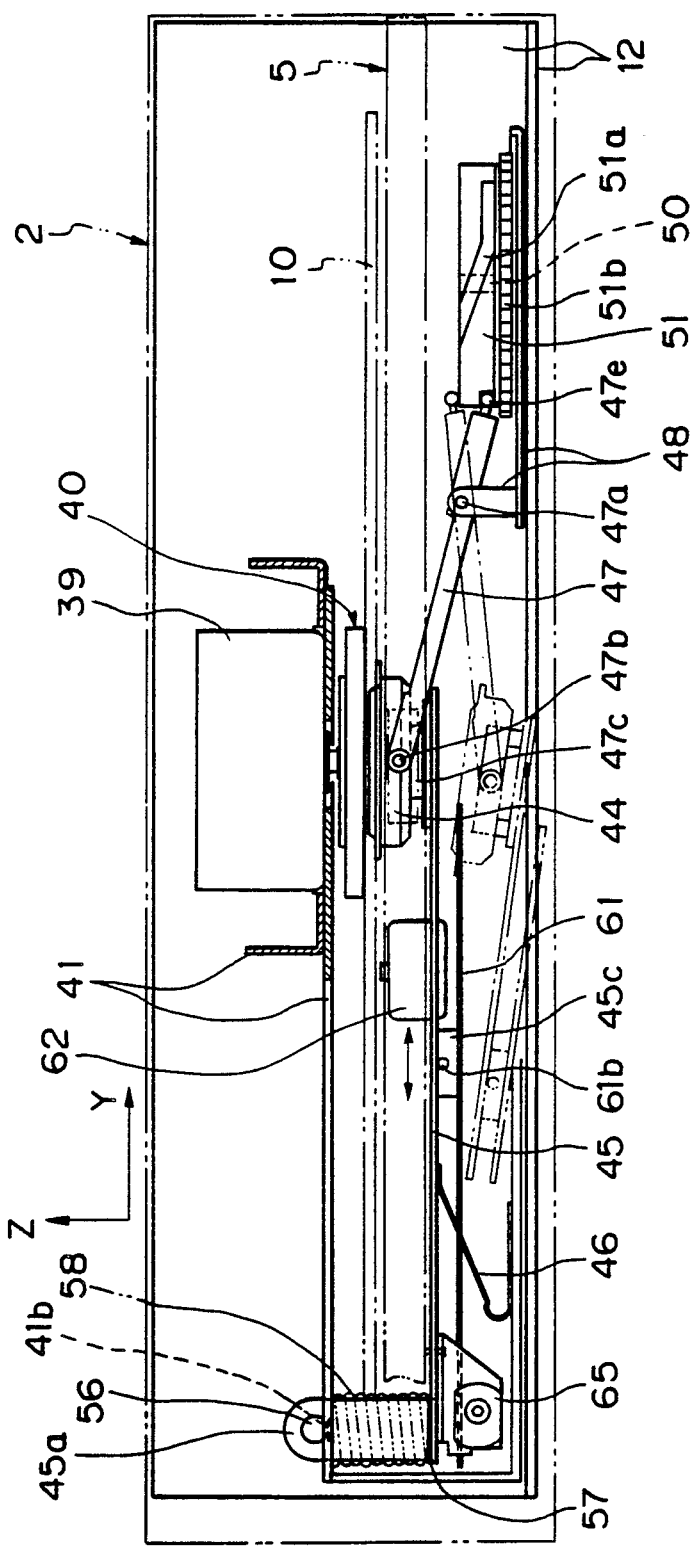
FIG. 8 is a front elevational view, partly in cross section, of the internal structure of FIG. 2.

As shown in FIGS. 1 and 8, a turntable 40 which directly be rotated by a motor 39 for rotating a disc 8, 9, or 10 carried thereon is disposed in the player housing 2 with a disc carrying surface of the turntable 40 being directed downwardly. The turntable 40 is attached to a subchassis 41 fixed as a first carrier member to the player housing 2, the subchassis 41 being also shown in FIG. 2. The tray 5 is movable in the fore-and-aft directions (the direction of the arrow Y and the direction opposite thereto) parallel to the disc carrying surface of the turntable 40.

A disc 10, for example, carried on the tray 5 and stored in the player housing 2 parallel to the disc carrying surface of the turntable 40 is positioned directly beneath the disc carrying surface of the turntable 40 with a prescribed gap or clearance therebetween. Then, the disc 10 positioned immediately below the turntable 40 is lifted away from the tray 5 upwardly (in the direction of the arrow Z) and clamped onto the disc carrying surface of the turntable 40 by the disc clamp mechanism.

Figure 9:
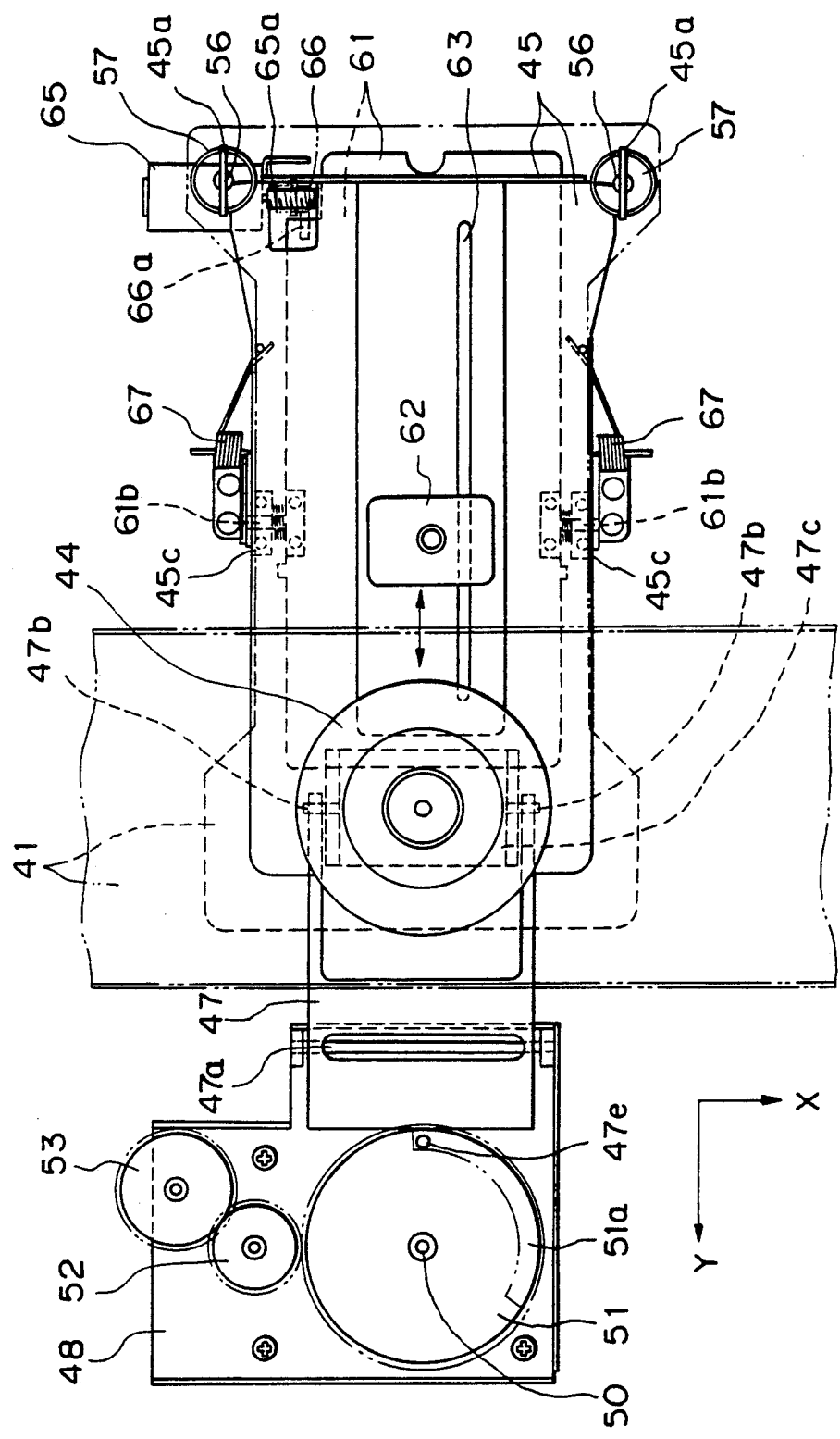
FIGS. 9 through 11 are views showing in detail the internal structure of FIG. 2.

As illustrated in FIGS. 1, 2, 8 through 10, the disc clamp mechanism has a disc-shaped presser member 44 for abutting against the disc 10 and pressing the disc 10 against the disc carrying surface of the turntable 40 under magnetic attraction, a support member 45 as a second carrier member rockable vertically (in the direction of the arrow Z and the direction opposite thereto), i.e., in a plane normal to the disc carrying surface of the turntable 4 and having a free end on which the presser member 44 is rotatably supported at the surface facing the disc carrying surface of the turntable 40, and a spring 46 (shown in FIG. 8) as an urging means for urging the support member 45 in a direction to move the presser member 44 toward the disc carrying surface of the turntable 40. As shown in FIGS. 2, 8 and 9, a lever 47 is disposed forwardly of the presser member 44 and vertically rotatably mounted on a smaller chassis 48 by means of a support pin 47a. The lever 47 has a rear end on which an intermediate member 47c is angularly movably supported by means of a pin 47b. The intermediate member 47c engages the free end of the support member 45 through the presser member 44.

Figure 11:
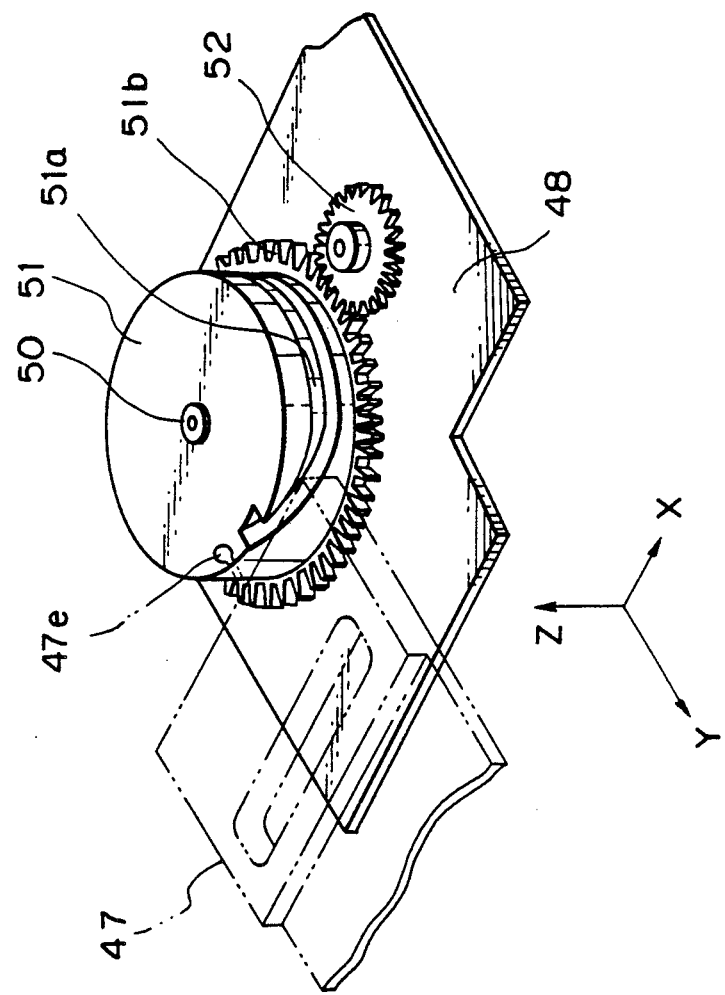

On the smaller chassis 48, there is mounted a support shaft 50 parallel to the central axis of rotation of the turntable 40, with a disc-shaped cam member 51 being rotatably mounted on the support shaft 50. As shown in FIG. 11, in particular, the cam member 51 has a helical cam groove 51a defined in an outer peripheral surface around the axis of rotation thereof. A round pin 47e projecting from the end of the lever 47 remote from the pin 47b is fitted in the cam groove 51a for smooth sliding movement therealong. The cam member 51 has an integral gear 51b which is held in mesh with the inner rack 14b of the guide rail 14 through two gears 52, 53. Upon energization of the motor 26, therefore, to move the guide rail 14 in the rearward direction, for example, the cam member 51 is rotated clockwise in FIG. 9 to turn the lever 47 clockwise in FIG. 8 for thereby angularly moving the support member 45 counterclockwise in FIG. 8 to clamp the disc 10 on the turntable 40. The disc 10 can be unclamped from the turntable 40 in a process which is a reversal of the above disc clamping process. When clamping and unclamping the disc 10, the lever 47 is turned while pressing the presser member 44 against the support member 45 against the resiliency of the spring 46 (FIG. 8). Therefore, the presser member 44 does not wobble while the support member 45 is being turned.

Figure 10:
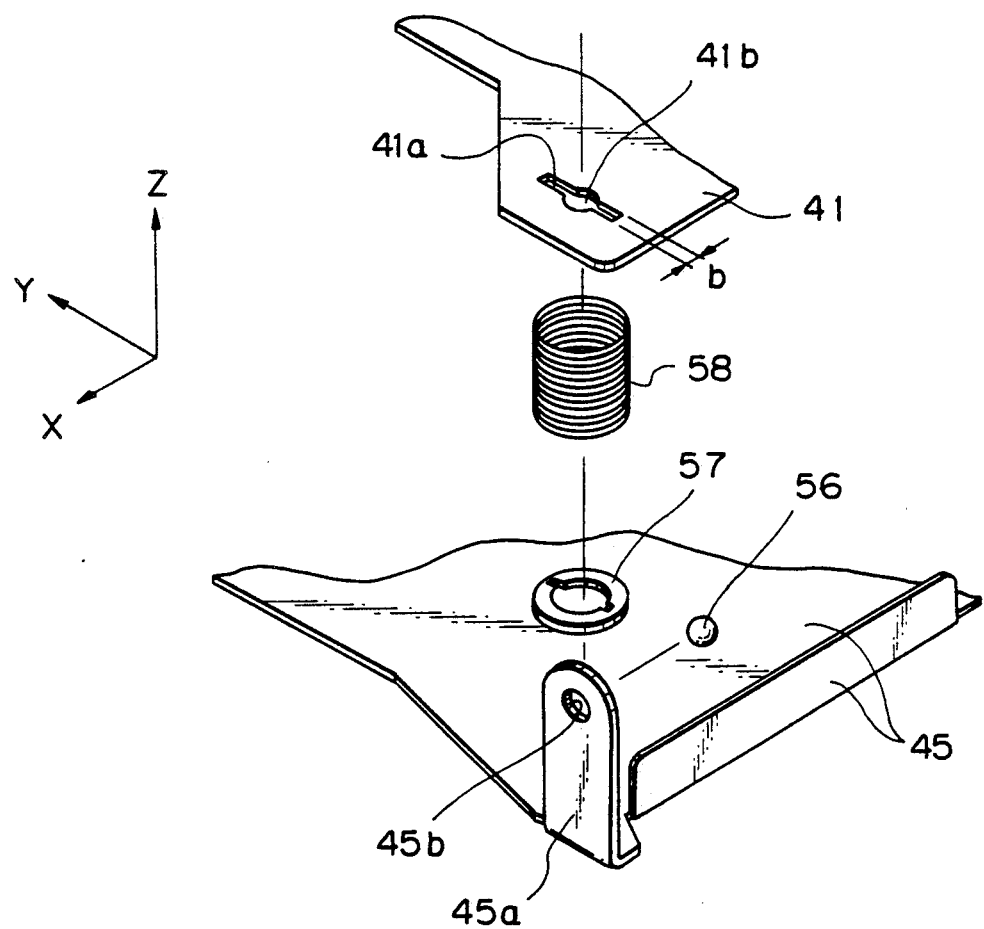

As shown in FIGS. 2, 8, and 10, a first rectangular opening 41a (FIG. 10) is defined in each side of the rear end of the subchassis 41, and the support member 45 has a projection 45a projecting upwardly from the rear end thereof and inserted through the first opening 41. The projection 45 has a second circular opening 45b defined therein. The second opening 45b is positioned above the first opening 41a and has a diameter larger than the width b (FIG. 10) of the first opening 41a. A spherical member 56 having a diameter greater than the width of the first opening 41a is disposed in the second opening 45b. A seat plate 57 is fixed to the lower end of the projection 45a. A coil spring 58 is disposed as an urging means between the seat plate 57 and the subchassis 41 for normally urging the subchassis 41 in a direction toward the spherical member 56. The first opening 41a includes a central circular opening 41b having a diameter greater than the width b of the first opening 41a and smaller than the diameter of the spherical member 56. The spherical member 56 engages in the circular opening 41b so as to be positioned with respect to the first and second openings 41a, 45b without positional deviation.

Thus, the spherical member 56 interposed between the support member 45 and the subchassis 41 and held in smoothly sliding contact with the support member 45 and the subchassis 41 is positioned by the circular opening 41b as a positioning means so as not to be positionally deviated in three directions, i.e., in the plane in which the support member 45 is rocked and the directions normal to this plane. By pressing the support member 45, the subchassis 41, and the spherical member 56 against each other under the resiliency of the coil springs 58, no gap or clearance is developed between these members in the plane in which the support member 45 is rocked. With this arrangement, the support member 45 can be rocked highly accurately without wobbling movement.

As shown in FIGS. 2, 8, and 9, a tiltable chassis 61 is angularly movably mounted on the lower surface of the support member 45 by means of a pair of brackets 45c of the support members 45 and a pair of pins 61b extending in the lateral directions (the direction of the arrow X) and pivotally coupled with the brackets 45c. A carriage 62 carrying an optical pickup is mounted on the tiltable chassis 61 and guided by a guide shaft 63 for movement along the recorded surface of the disc 10 mounted and clamped on the turntable 40. Although not shown, there is provided a positioning means for moving the carriage 62.

As shown in FIG. 9, a motor 65 is attached to the righthand rear end of the support member 45 for angularly moving the tiltable chassis 61. The motor 65 has an output shaft over which there is fitted a worm 65a meshing with a worm wheel 66 having a pin 66a positioned radially off center and engaging a free end of the tiltable chassis 61 in smoothly sliding contact therewith. The tiltable chassis 61 is biased by a pair of springs 67. When the motor 65 is energized, and under the biasing forces from the springs 67, the tiltable chassis 61 is angularly moved for tilt servo operation.

A system for producing a drive signal for the positioning means for turning and positioning the support member 45 includes a means for adding a signal indicative of the distance between the disc and the optical pickup, e.g., a low-frequency driving component.

Figure 12:
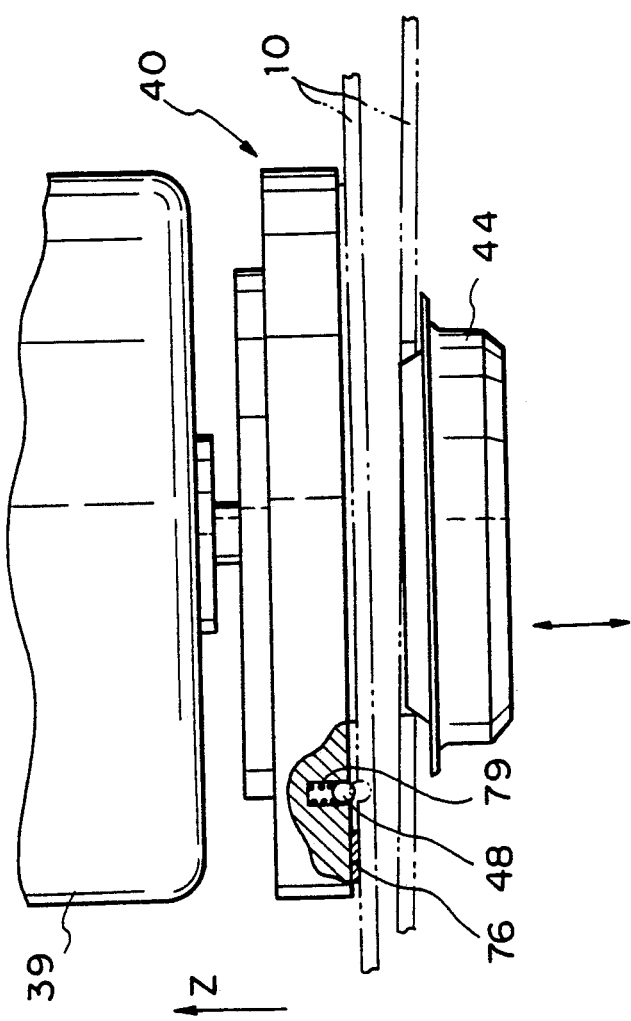
FIG. 12 is a side elevational view, partly in cross section, of a turntable.

The turntable 40 will be described in detail below. As shown in FIG. 12, an annular disc receiver member 76 made of rubber or the like is attached to the disc carrying surface of the turntable 40. Three low-friction members 48 comprising spherical members, for example, are mounted on the disc carrying surface at circumferentially equally spaced angular intervals, the low-friction members 48 being movable into and out of the disc carrying surface. The low-friction members 48 are normally urged in a direction out of the disc carrying surface by means of respective coil springs 79 disposed in the turntable 40 and acting on the respective low-friction members 48. The low-friction members 48 are brought into abutment against the disc surface when the disc 10 is displaced toward the disc carrying surface by the disc clamping mechanism including the presser member 44. As shown in FIG. 12, when the disc 10 is obliquely placed on the presser member 44, the disc 10 abuts against the low-friction members 48 as the presser member 44 and the disc 10 approach the turntable 40. Then, the disc 10 is corrected out of the inclined condition on the presser member 44 by the low-friction members 48 while at the same time the disc 10 is being slightly moved radially. The disc 10 is now clamped on the turntable 40 and centered highly accurately with respect to the turntable 40.

A playback sequence of the automatic loading disc player of the above construction will be described below.

As shown in FIG. 1, the tray 5 is projected out of the player housing 2, and the disc 10, for example, is placed on the tray 5. The process of projecting the tray 5 out of the player housing 2 is an exact reversal of a tray storing process which will be described hereinbelow, and hence will not be described. When the tray 5 is projected out of the player housing 2, the guide rails 13, 14 are also projected out of the player housing 2 for rigidly supporting the tray 5 thereon.

After the disc 10 has been placed on the tray 5, the switch pad 7 is operated upon to issue a disc playback command whereupon the motor 26 is energized. The tray 5 and the guide rails 13, 14 now start being stored into the player housing 2. When the tray 5 and the guide rails 13, 14 have been stored in the player housing 2, the engaging plate 36 (FIGS. 4(a) and 4(c)) mounted on the righthand guide rail 14 engages the free end of the swing plate 34 (FIG. 2) to turn the swing plate 34 upwardly. The clutches 19c, 19d of the gears 19a, 19b shown in FIG. 7 are disengaged from each other, after which only the gear 19b is rotated by the motor 26 to move only the guide rail 14 in the rearward direction. The lefthand guide rail 14 remains at rest on account of the tray 5 being stopped. The rearward movement of only the guide rail 14 causes the helical cam groove 51a of the cam 51 shown in FIG. 2 to turn the lever 47 clockwise in FIG. 8 through sliding engagement with the round pin 47e. The support member 45 is angularly moved counterclockwise by the lever 47 to lift the presser member 44 for elevating the disc 10 on the tray 5 and pressing the disc 10 against the disc carrying surface of the turntable 40. The disc 10 is clamped on the turntable 40 when a magnet (not shown) in the presser member 44 is magnetically attracted to the turntable 40. At this time, if the disc 10 is tilted on the presser member 44 as shown in FIG. 12, the disc 10 first abuts against the low-friction members 48 on the turntable 40 as the disc 10 approaches the disc carrying surface of the turntable 40. The disc 10 is then smoothly guided radially so as to be corrected out of the tilted condition, and is centered highly accurately with respect to the turntable 40. Then, the motor 26 is de-energized, and the disc 10 can now be played back.

The turntable 40 is thereafter rotated, and the carriage 62 supporting the optical pickup is moved to start playing back the disc 10. After the presser member 44 has clamped the disc 10 on the turntable 40 under magnetically attractive forces, the support member 45 which supports the presser member 44 is rendered movable in a gap between the presser member 44 and the support member 45 in order to allow the presser member 44 to be rotatable. While the disc 10 is being played back, the support member 45 is actuated in the gap range dependent on surface fluctuations of the disc 10 for thereby adjusting the height of the optical pickup. At the same time, the tiltable chassis 61 is actuated by the drive means to keep the optical axis of a light beam emitted from the optical pickup toward the recording surface of the disc 10 in perpendicular relation to the recording surface of the disc 10.

After the disc 10 has been played back, and when the arrival of the carriage 62 at a limit position is detected by a detector (not shown), the carriage 62 and the turntable 40 are stopped, and the motor 26 is reversed. The tray 5 and the guide rails 13, 14 are projected out of the player housing 2 as shown in FIG. 1 by a process which is a reversal of the process described above. Thereafter the disc 10 is retrieved, and the disc 8 or 9 may be played back in the same manner as described above.

An information recording disc playback apparatus according to a second embodiment of the present invention will be described below. The information recording disc playback apparatus of the second embodiment is identical in structure to the information recording disc playback apparatus of the first embodiment shown in FIGS. 1 through 12, except for the turntable, and hence its construction and operation, except for the turntable, will not be described in detail.

Figure 13:
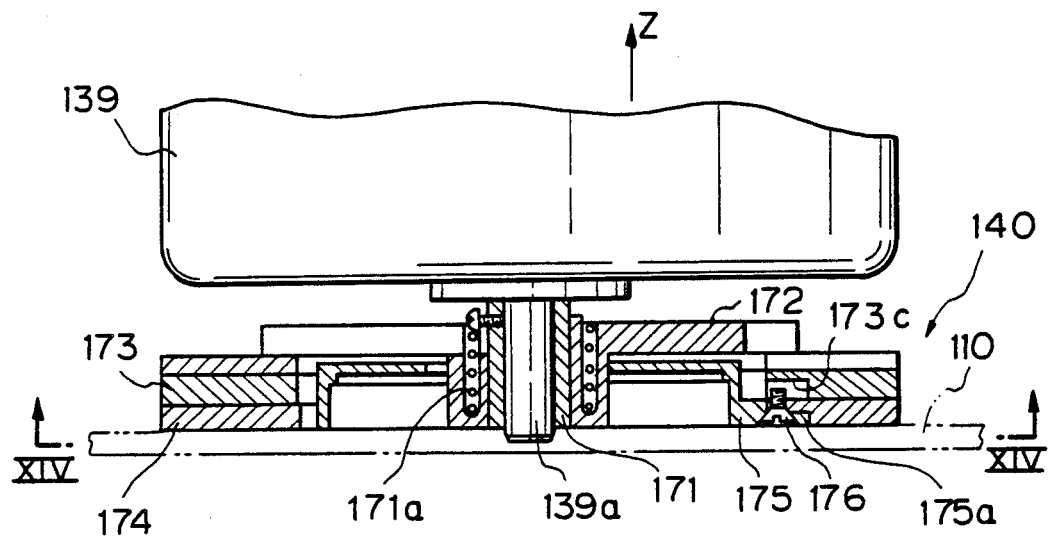
Figure 14:
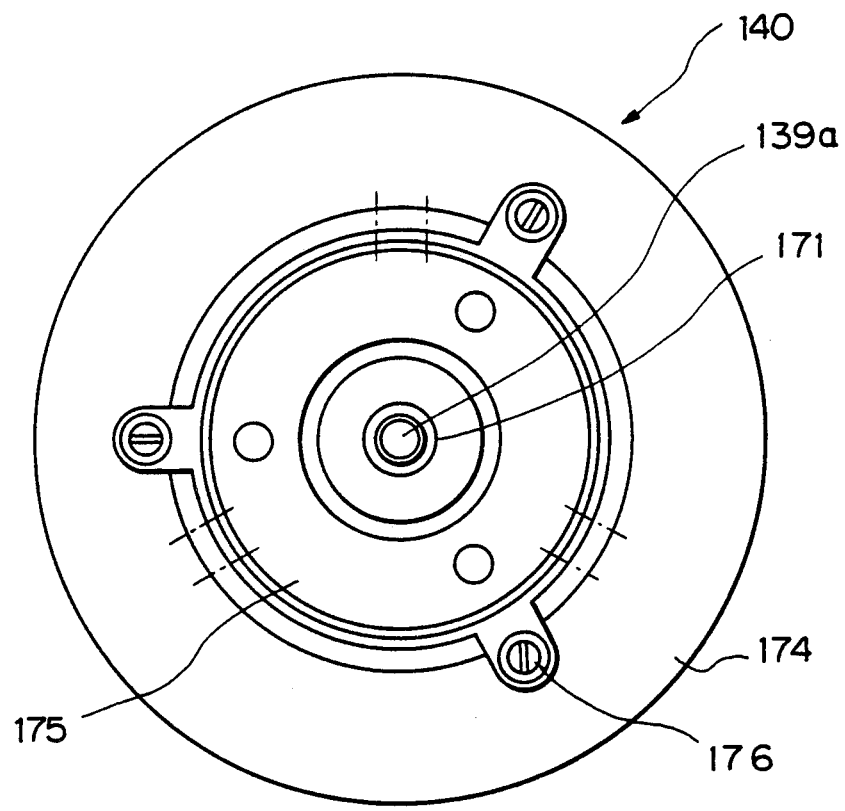

As illustrated in FIGS. 13 and 14, a turntable 140 in the information recording disc playback apparatus of the second embodiment has a collar 171 fitted over an output shaft 139a of a motor 139 which directly rotates the turntable 140, a disc-shaped support plate 172 slidably mounted on the collar 171, a coil spring 171a for applying biasing forces to the support plate 172 to urge the support plate 172 downwardly, and disc-shaped intermediate and disc carrying plates 173, 174 successively mounted on the support plate 172 in overlapping relation. The support plate 172 is shown in detail in FIGS. 15(a) through 15(d) and 16, and the collar 171 is shown in detail in FIGS. 17(a) and 17(b). FIGS. 18(a) through 18(c) and 19 show the intermediate plate 173 in detail, whereas FIGS. 20(a) through 20(c) and 21 show the disc carrying plate 174 in detail.

Figure 18A:
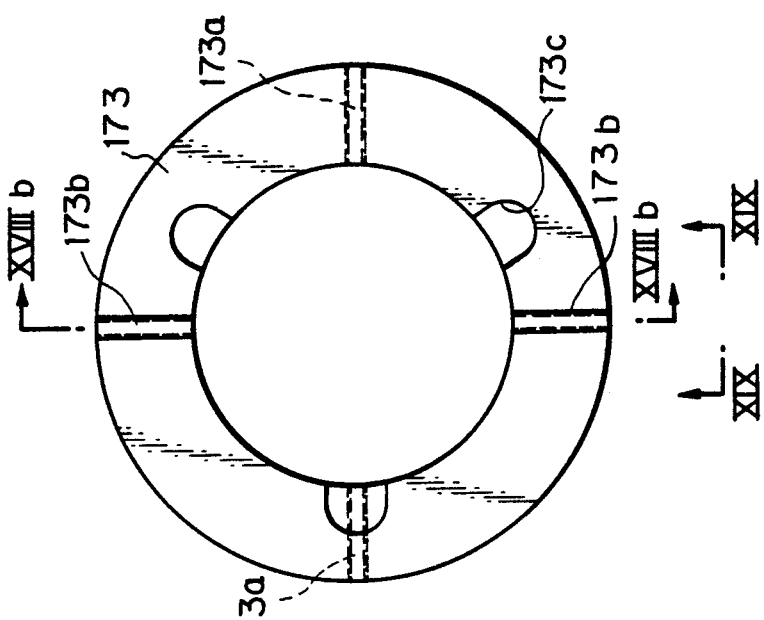
Figure 18B:
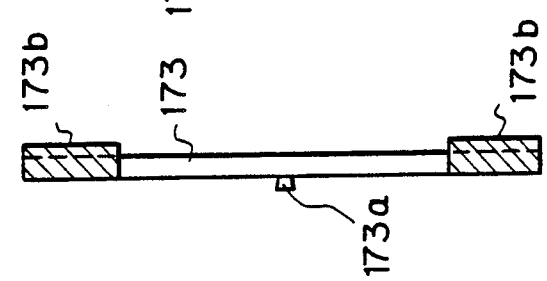
Figure 18C:
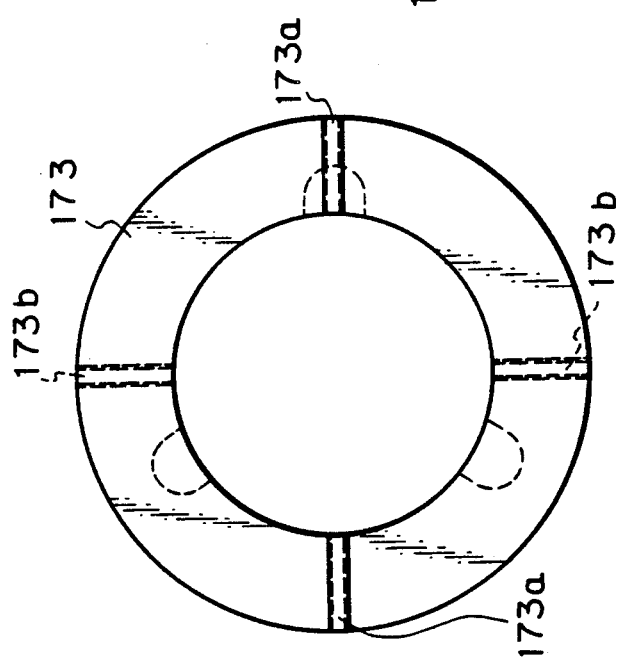
Figure 19:
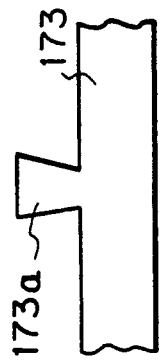
Figures 20A, 20B:
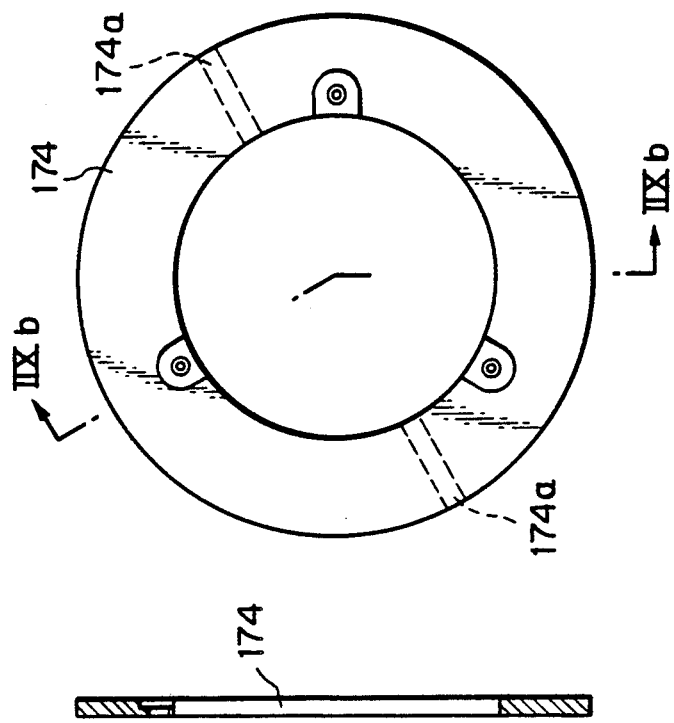
Figure 20C:
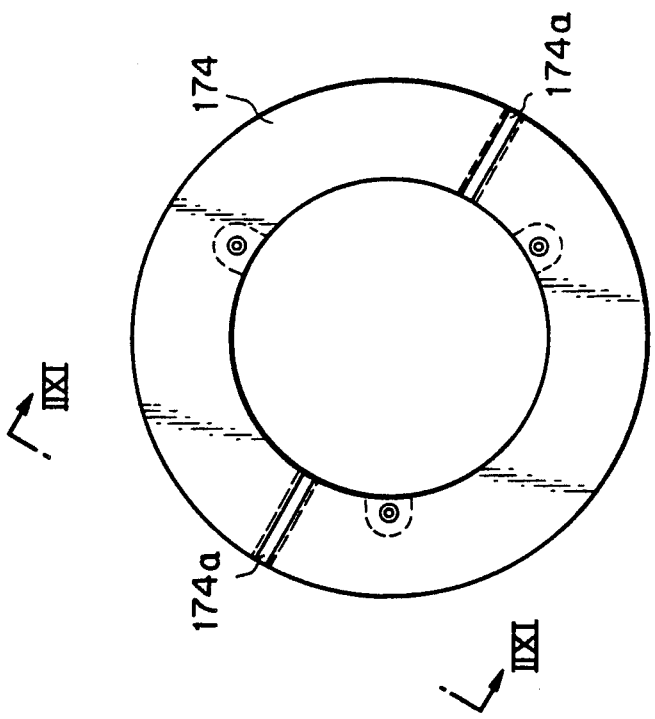
Figure 21:
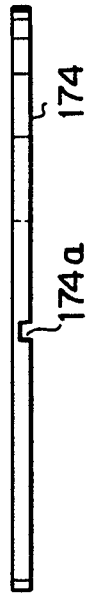

As shown in FIGS. 15(a), 15(c), 15(d), and 16, the support plate 172 has guide grooves 172a defined therein and having a trapezoidal cross section As shown in FIGS. 18(a) through 18(c), the intermediate plate 173 has guide ridges 173a of a trapezoidal cross section on one of its principal surfaces, the guide ridges 173a being slidably fitted respectively in the guide grooves 172a of the support plate 172. The intermediate plate 173 also has guide ridges 173b of a trapezoidal cross section on the other principal surface, the guide ridges 173b extending perpendicularly to the guide ridges 173a. As shown in FIGS. 20(a), 20(c), and 21, the disc carrying plate 174 has guide grooves 174a defined therein and having a trapezoidal cross section, the guide ridges 173b of the intermediate plate 173 being slidably fitted respectively in the guide grooves 174a of the disc carrying plate 174.

The intermediate plate 173 and the disc carrying plate 174 mounted on the support plate 172 are movable in two different mutually perpendicular directions parallel to their principal surfaces. As shown in FIGS. 13 and 14, the range in which the intermediate plate 173 and the disc carrying plate 174 are movable is limited by a retaining plate 175 which retains the intermediate plate 173 and the disc carrying plate 174 against dislodgement. The retaining plate 175 is generally annular and has projections 175a at which the retaining plate 175 is fastened onto the disc carrying plate 174 by means of screws 176. The retaining plate 175 is illustrated in detail in FIGS. 22(a) through 22(c). The intermediate plate 173 serves as a coupling means for carrying the disc carrying plate 174 on the support plate 172 so that the center of rotation of the disc carrying plate 174 can be displaced eccentrically with respect to the center of rotation of the support plate 172. The coupling means is not limited to the intermediate plate 173, or may be of other arrangement.

With the structure of the second embodiment, when a disc 110 is clamped on the turntable 140, the intermediate plate 173 and the disc carrying plate 174 are biaxially movable with respect to each other to center the disc 110 highly accurately with respect to the turntable 140.

FIG. 23 shows an information recording disc playback apparatus as a third embodiment of the present invention.

A tray 201 is movable into and out of a player housing 202 through a pair of guide rails 203. A selected one of three different discs 204, 205, 206 is placed on the tray 201 and then delivered thereby into a playback position in the player housing 202. The discs 204, 205 have respective diameters of about 30 cm and 20 cm, and the disc 206 is a so-called compact disc having a diameter of about 12 cm. For moving the tray 201, the tray 201 has a rack 201a along one side thereof substantially over its entire length in the directions in which the tray 201 is movable. A gear 208 meshing with the rack 201a is rotated by a motor (not shown) for moving the rack 201.

The tray 201 has concentric recesses 201b through 201d defined in its upper surface at different steps and having arcuate peripheral edges for receiving the respective discs. The tray 201 has a width B smaller than diameters $D_1$, $D_2$ of the recesses 201c, 201d.

A turntable 209 with its disc carrying surface directed downwardly is mounted in the player housing 202. A selected disc carried on the tray 201 and stored in the player housing 2 parallel to the disc carrying surface of the turntable 209 is positioned directly below the disc carrying surface of the turntable 209 with a prescribed gap or clearance left therebetween. The disc that has reached the position beneath the turntable 209 is lifted away from the tray 201 by a disc clamp mechanism 210, and clamped thereby on the disc carrying surface of the turntable 209. The disc clamp mechanism 210 comprises a disc-shaped presser member 211 for abutting against the disc and pressing the disc against the disc carrying surface of the turntable 209, a support member 212a angularly movable about a support pin 212 for vertical movement in a direction normal to the disc carrying surface of the turntable 209, the presser member 211 being rotatably supported on the free end of the support member 212a remote from the support pin 212, and a drive means (not shown) for swinging the support member 212. A carriage 213 carrying an optical pickup is mounted on the support member 212 and guided by a guide shaft 214 for movement along the recording surface of the disc mounted on the turntable 209. Although not shown, there is provided a drive means for moving the carriage 213.

In this embodiment, the width B of the tray 201 for delivering the disc is smaller than the diameter $D_2$ of the recess 201c for storing the disc 5 having a diameter of about 20 cm and larger than the diameter $D_3$ of the recess 201d for storing the compact disc 206 having a diameter of about 12 cm. The present invention is however not limited to these dimensions. The width B of the tray 201 may be smaller than the diameter $D_3$, or alternatively may be greater than $D_2$ and smaller than the diameter $D_1$.

As described above in detail, in the information recording disc playback apparatus of the present invention, the single movable member 45 which is movable in a plane that is substantially normal to the disc carrying surface of the turntable supports thereon the presser and gripper member 44 for gripping an optical information recording disc between itself and the disc carrying surface under magnetic attraction, and the guiding and positioning means for moving the optical pickup 62 substantially parallel to the disc carrying surface.

After the presser and gripper member has clamped the disc on the turntable under magnetic attraction, the movable member which is movable in a prescribed range with respect to the presser and gripper member is actuated at high speed within the movable range to adjust the height of the optical pickup dependent on surface fluctuations of the disc.

By thus employing the disc clamp mechanism as the mechanism for adjusting the height of the optical pickup, any mechanism employed for solely adjusting the height of the optical pickup in the conventional information recording disc playback apparatus is dispensed with, and the cost and size of the information recording disc apparatus are lowered.

In the information recording disc playback apparatus of the present invention, furthermore, the tiltable chassis 61 is swingably mounted on the movable member, and the optical pickup is supported on the tiltable chassis. By actuating the tiltable chassis, therefore, the optical axis of the light beam emitted from the optical pickup toward the recording surface of the optical information recording disc remains perpendicular to the recording surface of the disc.

The information recording disc playback apparatus of the invention is composed of the support member 45 movable in a plane substantially normal to the disc carrying surface of the turntable and supporting the disc presser member 44 on its side facing the disc carrying surface, and the drive means for moving the support member, the drive means comprising the urging means 46 for urging the support member in a direction for moving the presser member toward the disc carrying surface of the turntable, the movable member 47 being movable in a direction substantially parallel to the direction in which the support member is movable and being held in engagement with the presser member, and the pressing force applying means for applying pressing forces to the movable member in a direction opposite to the urging forces of the urging means for pressing the presser member against the support member.

While the presser member is being pressed against the support member under imbalance between the urging forces from the urging means and the pressing forces from the pressing force applying means, the support member is moved to complete disc clamping operation. With this arrangement, the presser member is prevented from wobbling and being displaced while the support member is in motion, and hence the disc can be clamped on the turntable smoothly and reliably at all times.

The information recording disc playback apparatus of the invention comprises the presser member 44 for pressing the optical information recording disc against the disc carrying surface of the turntable, the support member 45 movable in a plane substantially normal to the disc carrying surface and supporting the presser member, and the drive means for moving the support member, the drive means comprising the lever 47 having one end engaging the support member, the cam 51 rotatable about the central axis of rotation which is substantially normal to the disc carrying surface of the turntable and having the helical cam groove defined about the central axis and slidably contacting the lever at the opposite end thereof, and the rotative force applying means for applying rotative forces to the cam.

Since the support member on which the presser member is rotatably supported is movable by rotation of the small helical cam, the entire apparatus is smaller in size than the conventional information recording disc playback apparatus in which the support member is movable by translation of the large flat cam.

Furthermore, inasmuch as the lever is interposed between the support member and the helical cam, the drive forces to be imposed on the support member and the stroke of movement of the support member can freely be adjusted by selecting the positions of the opposite ends of the lever.

The information recording disc playback apparatus of the present invention has the tray movable into and out of the player housing for carrying and delivering a disc into the playback position in the disc playback means, the rack disposed on the tray and extending along the directions in which the tray is movable, and the drive force applying means including the gear meshing with the rack for applying drive forces to the rack, the rack having an innermost portion (16a, 17a) in the direction in which the tray is stored and the innermost portion being angularly movable with respect to the remaining portion of the rack.

When the tray is projected a certain distance out of the player housing for placing a disc on or removing a disc from the tray, the innermost portion (16a, 17a) meshing with the gear remains in the player housing. As the tray is stored into the player housing, the innermost portion is angularly moved or bent a right angle, for example, with respect to the direction in which the tray is stored With this arrangement, the player is reduced in its depth.

The innermost portion is pivotally supported on the remainder of the rack at an intermediate position between the rack and non-rack portions of the innermost portion. The innermost portion is urged in a direction to be angularly moved or bent into abutment against the stopper so as to be kept in line with the remainder, the non-rack portion being flexible. When the non-rack portion is turned into a position beyond the stopper, the innermost portion can be separated from the remainder.

In the position taken by the non-rack portion beyond the stopper, the innermost portion can be attached to and detached from the tray. More specifically, when the innermost portion is to be dismounted from the tray, the non-rack portion is flexed by fingers out of engagement with the stopper, while at the same time the innermost portion is turned into the position beyond the stopper, and the innermost portion is removed in this position. The innermost portion can be installed on the tray in a process which is a reversal of the above detaching process. Therefore, when installing the innermost portion on the tray, any retaining nut is not required, and the innermost portion can quickly be mounted in place. The assembling procedure can thus be effected highly efficiently.

The information recording disc playback apparatus of the present invention includes the tray guided by the guide rails disposed in the player housing for movement into and out of the player housing for carrying and delivering a disc into a position near the playback position in the playback means, the drive means for moving the tray, and the disc clamp mechanism for displacing the disc having reached the position near the playback position, off the tray, and pressing the disc into the playback position for playback, the guide rails being movable in the tray guiding directions.

The tray projecting out of the player housing is rigidly supported by the guide rails for preventing itself from any slight wobbling movement.

The guide rails are moved by drive forces imposed by the drive means for moving the tray. After the tray has been stored in the player housing, the drive means moves one of the guide rails only.

Therefore, any drive means which would be dedicated to move the guide rails only is dispensed with. The disc clamp mechanism can be operated by utilizing forces with which the guide rail is moved after the tray has been stored. The tray, the guide rails, and the disc clamp mechanism can thus be operated by the single drive means. As a result, the number of parts used is reduced, and so is the cost of the apparatus. Since the number of parts used is reduced, the space in the apparatus is also reduced, resulting in a reduction in the size of the entire apparatus.

The information recording disc playback apparatus according to the present invention comprises the tray movable into and out of the player housing in directions parallel to the disc carrying surface of the turntable for carrying and delivering a disc into a position near the turntable, the drive means for moving the tray, and the disc clamp mechanism for displacing the disc having reached the position near the turntable, off the tray, and pressing the disc against the disc carrying surface of the turntable, the turntable having low-friction members 48 movable into and out of the disc carrying surface thereof.

As the disc is caused by the disc clamp mechanism to approach the disc carrying surface of the turntable, the disc is smoothly guided radially by the low-friction members while at the same time the disc is corrected out of its any tilted condition, until the disc is centered highly accurately with respect to the turntable.

In addition, the information recording disc playback apparatus of the present invention comprises the first carrier member 41 carrying the turntable and the motor for directly rotating the turntable, the second carrier member 45 carrying the optical pickup and the presser member 44 for pressing the information recording disc against the disc carrying surface of the turntable, the first and second carrier members being relatively moved in a plane substantially normal to the disc carrying surface for mounting and clamping the information recording disc on the turntable, the turntable being composed of the support plate fixed to the rotatable shaft of the motor, the disc carrying plate mounted on the support plate for carrying the information recording disc, and the coupling means for carrying the disc carrying plate on the support plate to allow the center of rotation of the disc carrying plate to be displaced eccentrically with respect to the center of rotation of the support plate.

More specifically, when clamping the disc, the disc carrying plate is slightly moved perpendicularly to the rotation axis thereof to center the disc highly accurately with respect to the presser member. Therefore, by increasing the relative positional accuracy of the presser member and the optical pickup, the disc on the turntable and the optical pickup can be relatively positioned with high accuracy.

The process of manufacturing the apparatus is shortened since the disc carrying assembly of the turntable comprises the support plate, the intermediate plate, and the disc carrying plate, and only the relative position of the presser member and the optical pickup is required to be of increased accuracy.

The information recording disc playback apparatus of the present invention has the tray movable into and out of the player housing and having a recess having an arcuate outer peripheral edge for carrying and delivering a disc into a playback position, the tray having a width smaller than the diameter of the recess (if there are a plurality of recesses, the diameter of one of the recesses).

Therefore, the space to be kept in the player housing for movement of the tray is reduced, and so is the size of the player or apparatus in its entirety. The cost of materials required of the apparatus is also lowered, and so is the cost of manufacture of the apparatus. The degree of design freedom in the player housing is increased.

With this arrangement, the disc placed on the tray projects radially beyond the tray, and can easily be gripped by the user when the tray is projected out of the player housing. The apparatus is thus easy to handle.

According to the present invention, moreover, the rotative support mechanism comprises the support member 41 having the first opening 41a defined therein and through which the angularly movable member 45 is inserted, the second opening 45b defined in the portion 45a of the angularly movable member 45 which is inserted through the first opening, the spherical member 56 disposed in the second opening at one opening side of the first opening and having a diameter larger than the width of the first opening, the urging means 58 for urging the angularly movable member in a direction to move the support member toward the spherical member, and the positioning means 41b for positioning the spherical member with respect to the first and second openings.

The spherical member disposed between the angularly movable member and the support member and held in smoothly sliding contact with the angularly movable member 45 and the support member is positioned by the positioning means so as not to be displaced in three directions, i.e., the plane in which the angularly movable member is angularly movable and the directions normal to the plane. By pressing the angularly movable member, the support member, and the spherical member together with the urging means, the gaps between these three members are eliminated at least in the plane in which the angularly movable member is angularly movable.

With this construction, the angularly movable member can be rotated highly accurately without wobbling movement.

Although certain preferred embodiments have been shown and described, it should be understood that many changes and modifications may be made therein without departing from the scope of the appended claims.

What is claimed is:

1. An information recording disc playback apparatus comprising a turntable having a disc carrying surface for carrying an optical information recording disc thereon, a single movable member pivotably movable in a plane substantially normal to said disc carrying surface, a presser and gripper member mounted on said single movable member for gripping the optical information recording disc between said presser and gripper member and said disc carrying surface, a tiltable chassis pivotably mounted on said single movable member, guiding and positioning means mounted on said single movable member for moving an optical pickup substantially parallel to said disc carrying surface, said optical pickup being disposed on said tiltable chassis, and positioning means for positioning said movable member.

2. An information recording disc playback apparatus according to claim 1, further including a system for producing a drive signal for said positioning means, said system having means for adding a signal indicating the distance between the disc and said optical pickup to said drive signal.

3. An information recording disc playback apparatus comprising a turntable having a disc carrying surface for carrying an information recording disc, a presser member for pressing the disc against said disc carrying surface, support member movable in a plane substantially normal to said disc carrying surface and supporting said disc presser member on its side facing said disc carrying surface, and drive means for moving said support member, said drive member comprising urging means for urging said support member in a direction to move said presser member toward said disc carrying surface, a lever being pivotably movable in a plane substantially parallel to the plane in which said support member is movable and being held in engagement with said presser member, and pressing force applying means for applying pressing forces to said lever in a direction opposite to the urging forces of said urging means for pressing said presser member against said support member.

4. An information recording disc playback apparatus comprising a turntable having a disc carrying surface for carrying an information recording disc, a presser member for pressing the optical information recording disc against said disc carrying surface, a support member movable in a plane substantially normal to said disc carrying surface and supporting said presser member, and drive means for moving said support member, said drive means comprising a pivotable lever having one end engaging said support member, a cam rotatable about a central axis of rotation which is substantially normal to said disc carrying surface and having a helical cam groove defined about said central axis and slidably contacting said lever at the opposite end thereof, and rotative force applying means for applying rotative forces to said cam.

5. An information recording disc playback apparatus comprising a player housing, a tray movable into and out of said player housing for carrying and delivering a disc into a playback position in said player housing means, and drive means for moving said tray, said drive means comprising a rack disposed on the tray and extending along directions in which said tray is movable, and drive force applying means including a gear meshing with said rack for applying drive forces to said rack, said rack having an innermost portion in a direction in which said tray is stored into said player housing, and said innermost portion being angularly movable with respect to a remainder of said rack.

6. An information recording disc playback apparatus according to claim 6, wherein said innermost portion is pivotally supported on the remainder of said rack at an intermediate position between rack and non-rack portions of said innermost portion, said innermost portion being urged in a direction to be angularly moved into abutment against a stopper so as to be kept in line with said remainder, said non-rack portion being flexible, the arrangement being such that when said non-rack portion is turned into a position beyond said stopper, said innermost portion can be separated from said remainder.

7. An information recording disc playback apparatus comprising a player housing, a guide rail disposed in said player housing, a tray guided by said guide rail for movement into and out of said player housing for carrying and delivering a disc into a position near a playback position in playback means, drive means for moving said tray, and a disc clamp mechanism for displacing the disc having reached the position near the playback position, off said tray, and pressing the disc into the playback position for playback, said guide rail being movable in tray guiding directions by drive forces imposed by said drive means for moving said tray, the arrangement being such that after said tray has been stored in said player housing, said drive means moves said guide rail only.

8. An information recording disc playback apparatus comprising a player housing, a turntable having a disc carrying surface for carrying a disc thereon, a tray movable into and out of said player housing in directions parallel to said disc carrying surface for carrying and delivering the disc into a position near said turntable, drive means for moving said tray, and a disc clamp mechanism for displacing the disc having reached the position near the turntable, off said tray, and pressing the disc against said disc carrying surface, said turntable having low-friction members movable into and out of said disc carrying surface.

9. An information recording disc playback apparatus comprising a turntable having a disc carrying surface for carrying an information recording disc thereon, a motor for directly rotating said turntable, a first carrier member carrying said turntable and said motor, a second carrier member carrying an optical pickup and a presser member for pressing the information recording disc against said disc carrying surface, said first and second carrier members being relatively movable in a plane substantially normal to said disc carrying surface for positioning and pressing the information recording disc on said disc carrying surface, said turntable being composed of a support plate fixed to a rotatable shaft of said motor, a disc carrying plate mounted on said support plate for carrying the information recording disc, and coupling means for carrying said disc carrying plate on the support plate to allow the center of rotation of said disc carrying plate to be displaced eccentrically with respect to the center of rotation of said support plate.

10. An information recording disc playback apparatus according to claim 9, wherein said coupling means comprises an intermediate plate mounted on said support plate for movement in at least one direction and supporting said disc carrying plate for movement in a direction different from said one direction.

11. An information recording disc playback apparatus comprising a player housing, a tray movable into and out of said player housing and having a recess having an arcuate outer peripheral edge for carrying and delivering a disc into a playback position in disc playback means, and drive means for moving said tray, said tray having a width smaller than the diameter of said recess.

* * * * *